United States Patent [19]

Kieschke et al.

[11] Patent Number: 5,087,303
[45] Date of Patent: Feb. 11, 1992

[54] MANUFACTURE OF METAL/FIBER COMPOSITES

[75] Inventors: Robert R. Kieschke; Trevor W. Clyne, both of Cambridge, England

[73] Assignee: Rolls-Royce plc, London, England

[21] Appl. No.: 592,839

[22] Filed: Oct. 4, 1990

[51] Int. Cl.$^5$ .................... C23C 8/00; C23C 28/00
[52] U.S. Cl. .................... 148/276; 148/277; 148/281; 427/333; 427/399; 427/404
[58] Field of Search ............. 148/276, 277, 284, 281; 427/333, 399, 404, 419.3, 214, 217

[56] References Cited

U.S. PATENT DOCUMENTS 4,159,357  6/1979  Grunke .................... 427/399
4,664,946  5/1987  Enomoto et al. ............ 427/399

Primary Examiner—Jay H. Woo
Assistant Examiner—James P. Mackey
Attorney, Agent, or Firm—Cushman, Darby & Cushman

[57] ABSTRACT

In the pursuit of the forming of light composite materials which may be substituted for metal without loss of strength, composites have been manufactured from silicon carbide fibers in a titanium matrix. Titanium diffuses into the given boundaries of the silicon carbide and degrades it. Yttria has been sandwiched between the titanium and silicon carbide, to provide a reaction skin of yttria which reduces the extent of diffusion. The present invention oxidizes the silicon carbide prior to applying the yttrium and thus further improves the resistance to diffusion.

5 Claims, 1 Drawing Sheet

MANUFACTURE OF METAL/FIBER COMPOSITES

BACKGROUND OF THE INVENTION

1. Field of the Invention

The present invention relates to composite materials comprising metal sheathed ceramic fibers.

2. Description of the Related Art

In our co-pending published patent application GB2219006A there is disclosed and claimed a method of reducing the diffusion of defined metals into silicon carbide fibers when making a composite structure, which comprises the covering of the fiber with a contact coating of one of the metals defined therein and then covering the metal with a coating of an oxide thereof.

The method claimed by the invention in GB2219006A was an improvement over the prior art, but some diffusion still occurs. It has been found however, that now, the diffusion is not of the kind where there is interchange of atoms across the interface between the differing materials, which if it were, would result in an alloy consisting of the metal and silicon carbide; rather, the metal diffuses into the grain boundaries of the silicon carbide.

The present invention seeks to further improve the method of forming a composite material from a defined metal or its alloys and ceramic fibers.

SUMMARY OF THE INVENTION

The invention is a method of inhibiting the diffusion of a metal coating, which is capable of producing a thermodynamically stable oxide, into the grain boundaries of a silicon carbide substrate comprising the step of heating treating the substrate in air so as to generate an external layer of silica, prior to applying the metal coating.

BRIEF DESCRIPTION OF THE DRAWINGS

The invention will now be described by way of example and with reference to the accompanying drawings in which FIGS. 1 to 2 inclusive depict the inventive step

DESCRIPTION OF THE PREFERRED EMBODIMENT

Figure 1:
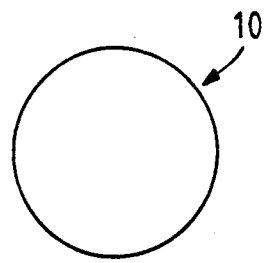

FIG. 1 depicts a silicon carbide fiber 10 of cylindrical cross section.

Figure 2:
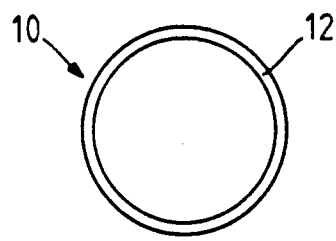

FIG. 2 depicts the same fiber 10 after it has been heated in air for eight hours at a temperature of 1000° C. The outer surface of the fiber has oxidize, i.e. it has been converted to a layer of silica 12.

Figure 3:
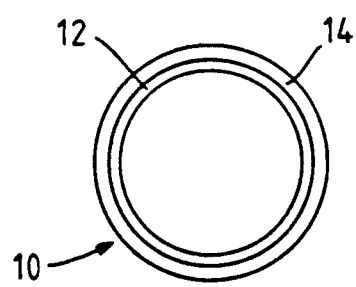
FIGS. 3 and 4 depict the further steps necessary to complete the composite material.

In FIG. 3, yttrium 14 has been applied to the oxidized outer layer 12 of the fiber 10, under conditions of vacuum, or alternatively, whilst in an inert atmosphere of e.g., argon. The yttrium 14 in the present example has been applied by the known process of sputtering, but other methods such as vapor deposition may be utilized.

Figure 4:
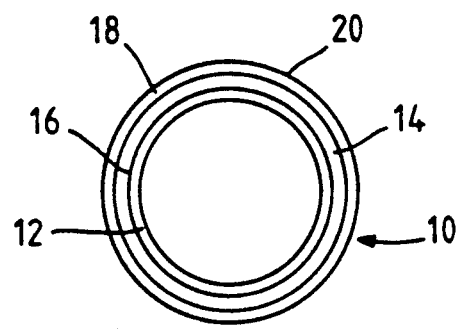

In FIG. 4, the sputtered yttrium 14 has reacted with the silica 12 at their interface to form a layer of yttria 16.

A layer of titanium 18 is then applied to the silica, yttria and yttrium covered fiber by wrapping a titanium foil around the yttrium layer, heating the whole in a vacuum to a temperature of 925° C., and holding that temperature for twenty five minutes, and over the same time period, applying a pressure of 15 mega pascals to the structure.

A subsequent heat treatment is then effected by way of heating the whole to 950° C. and maintaining that temperature for two hours. This final step effects further reaction at all of the interfaces of the layers and thus increases the ability of the silica to inhibit diffusion of yttrium into the silicon carbide fiber and the ability of the yttria to inhibit diffusion of the yttrium.

We claim:

1. A method of inhibiting the diffusion of a metal coating, which is capable of producing a thermodynamically stable oxide, into the grain boundaries of a silicon carbide substrate comprising the steps of:

heating the substrate in air prior to applying the metal coating so as to oxidize the substrate surface, then applying the metal coating to the oxidized surface of the substrate such that the metal coating oxidizes only at an interface between the oxidized substrate surface and the metal coating, and then applying a further metal coating to the metal coating and further heating the such coated substrate to cause further oxidation only at all of a plurality of interfaces between the substrate and oxidized substrate surface, the oxidized substrate surface and metal coating, and the metal coating and further metal coating, respectively.

2. The method of claim 1 wherein the heating step is conducted at 1000° C.

3. The method of claim 1 wherein the heating step is conducted for a period of eight hours.

4. The method as claimed in claim 1, wherein the metal coating comprises yttrium.

5. The method as claimed in claim 1 wherein the further metal coating comprises titanium or a titanium alloy.

* * * * *